United States Patent [19]

Hirsch et al.

[11] Patent Number: 5,583,305

[45] Date of Patent: Dec. 10, 1996

[54] PIPE CLAMPING DEVICE

[75] Inventors: Daniel J. Hirsch, Waukegan; Mark M. Pillard, Lake Villa, both of Ill.

[73] Assignee: Westinghouse Electric Corporation, Pittsburgh, Pa.

[21] Appl. No.: 533,497

[22] Filed: Sep. 25, 1995

Related U.S. Application Data

[63] Continuation of Ser. No. 274,082, Jul. 12, 1994, abandoned.

[51] Int. Cl.$^6$ ................................................. B23K 5/22
[52] U.S. Cl. ..................... 73/865.8; 228/105; 228/212
[58] Field of Search ......................... 73/865.8, 866.5, 73/623; 348/84, 90; 324/220; 228/103–105, 212, 213, 56.5, 44.5; 269/43

[56] References Cited

U.S. PATENT DOCUMENTS

| | | | |
|---|---|---|---|
| 3,168,908 | 2/1965 | Zurbrigen et al. | 348/84 |
| 3,750,928 | 7/1973 | Valentine . | |
| 4,006,359 | 2/1977 | Sullins et al. | 73/623 |
| 4,042,231 | 8/1977 | Kopczynski et al. | 269/48.1 |
| 4,253,599 | 3/1981 | Slavens . | |
| 4,525,616 | 6/1985 | Slavens | 219/60 R |
| 4,601,204 | 7/1986 | Fournot et al. | 73/866.5 |
| 4,641,529 | 2/1987 | Lorenzi et al. | 73/623 |
| 4,828,160 | 5/1989 | Sundholm | 228/42 |
| 4,857,701 | 8/1989 | Slavens | 219/125.12 |
| 4,919,223 | 4/1990 | Egger et al. | 348/84 |
| 5,090,608 | 2/1992 | Joner | 228/49.3 |
| 5,118,024 | 6/1992 | McClure | 228/44.5 |
| 5,435,478 | 7/1995 | Wood et al. . | |

FOREIGN PATENT DOCUMENTS

| | | |
|---|---|---|
| 0443448 | 8/1991 | European Pat. Off. . |
| 286103 | 1/1971 | U.S.S.R. . |
| 2202647 | 9/1988 | United Kingdom . |

Primary Examiner—Robert Raevis
Attorney, Agent, or Firm—David G. Maire

[57] ABSTRACT

An I.D. pipe clamp used for holding the ends of two pipes during welding, and having a means for inspecting the inside diameter of the root pass of the weld without removal of the pipe clamp or breaking of the purge gas seal. The pipe clamp has a frame with two clamping mechanisms for locking the clamp in position within the pipe ends. A means for inspecting, such as a video camera or other nondestructive testing device, is mounted on the pipe clamp between the two clamping mechanisms. Gas purge dams are located proximate each clamping mechanism to facilitate the creation of an inert gas purge in the region of the weld joint. The means for inspecting is operated to inspect the root pass of the weld prior to breaking the gas purge and prior to removal of the pipe clamp. The pipe clamp may also support a means for dressing of the weld I.D., such as a brush or a grinding tool, along with a vacuum line for removal of debris created during operation of the means for dressing.

18 Claims, 1 Drawing Sheet

PIPE CLAMPING DEVICE

This application is a continuation of application Ser. No. 08/274,082 filed Jul. 12, 1994, now abandoned.

BACKGROUND OF THE INVENTION

This invention relates generally to the field of clamping devices for aligning and holding the ends of pipes during the welding of the pipe ends. In particular, this invention relates to a pipe clamp which mounts on the inside diameter of two pipe ends and which provides a means for supporting the pipe ends while they are being welded together and for inspecting the inside diameter surface of the weld without removal of the pipe clamp or releasing of the purge gas seal.

When welding together sections of pipe, such as when fabricating a pipeline, it is known in the art to utilize a clamping device to align the ends of the pipes and to hold the pipe ends steady during the welding process. The pipe welds are typically inspected from the pipe exterior after the weld is completed. A volumetric inspection from the pipe exterior will reveal any defect throughout the weld's thickness. When a defect is found, a repair is made by machining or grinding the weld metal until the defect is removed, then rewelding the repair area. Defects may originate in the root pass of the weld as a result of misalignment of the pipe ends, contamination of the weld metal, improper welding process parameters, etc. Defects in the root pass may require removal of the entire thickness of the weld. Therefore, it is desirable to inspect the root pass prior to continuing the welding process to identify defects before they are covered by further layers of weld metal. The outside surface of the root pass is usually accessible to the weld operator or inspector, however, some defects may not be detectable without access to the inside diameter of the pipe, especially if a visual inspection technique is being used. With prior art pipe clamps, such as the device taught in U.S. Pat. No. 5,090,608, the pipe clamp must be removed in order to gain access to the I.D. of the root pass. With this type of prior art clamp, any inert gas purge seal established inside the pipe around the weld joint area would have to be broken for the inspection to take place, then reestablished if a repair weld was needed. Removal of the pipe clamp after completion of only the root weld pass may also result in unacceptably high stresses on the weld metal due to forces in the pipes.

SUMMARY

In light of the problems and limitations associated with the use of prior art clamping devices, it is an object of this invention to provide a pipe clamp which mounts on the inside of the pipe, and which facilitates the inspection of the I.D. of the root pass weld metal. It is a further object of this invention to provide a pipe clamp which permits access to the I.D. of a weld without the need to break the seal of any gas purge being maintained over the root area. It is a further object of this invention to provide a pipe clamp which facilitates inspection of the I.D. of the root pass of the weld and which provides for dressing of the root pass weld metal without the removal of the clamp or breaking of the purge gas seal.

These and other objects are accomplished by a pipe clamp used for securing a first pipe having a first pipe end in relation to a second pipe having a second pipe end to form a gap of predetermined dimensions between the first and the second pipe ends, the pipe clamp having a frame adapted for insertion into the first and second pipes; a first means for clamping attached to the frame, the first means for clamping adapted to secure the frame in relation to the first pipe end; a second means for clamping attached to the frame, the second means for clamping adapted to secure the frame in relation to the second pipe end; and means for inspecting supported within the pipes between the first and second means for clamping.

DETAILED DESCRIPTION OF THE INVENTION

Figure 1:
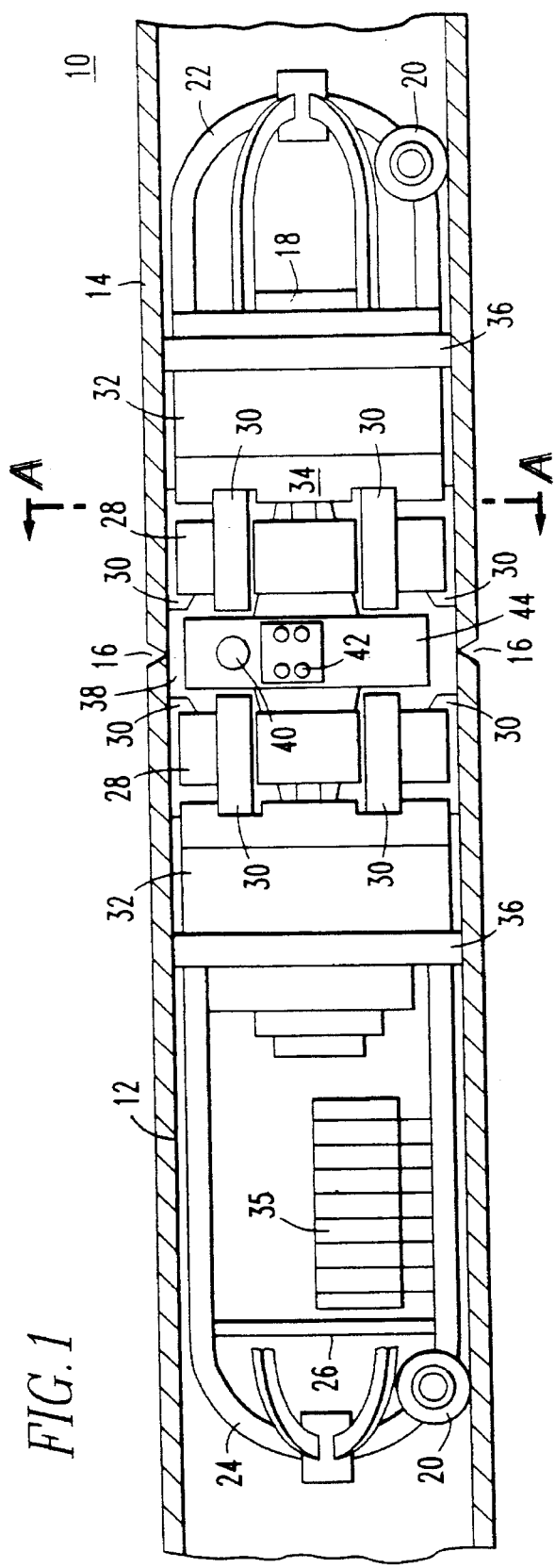
FIG. 1 is a sectional view of a pipe clamp constructed in accordance with this invention.

FIG. 1 illustrates a pipe clamp 10 installed within the inside diameter of two pipe end sections 12,14 which are to be joined together by means of a weld. A welding gap 16 of predetermined dimensions is established and maintained between the two pipe ends 12,14 by securing the pipe clamp 10 within the pipes. The welding gap 16 may be as small as zero for some weld geometries.

Pipe clamp 10 is built around a central frame 18 which is shown in this embodiment as a hollow shaft. The frame 18 provides structural rigidity to the clamp 10, and in the case of the hollow shaft shown, it may also provide a conduit for cable and hose routing. The clamp 10 may be fitted with wheels 20 and tapered nose 22 and tail 24 pieces to facilitate its installation and removal. Cables and hoses (not shown) may be attached to the pipe clamp 10 at a bulkhead 26 which is protected by the tapered tail piece 24.

Figure 2:
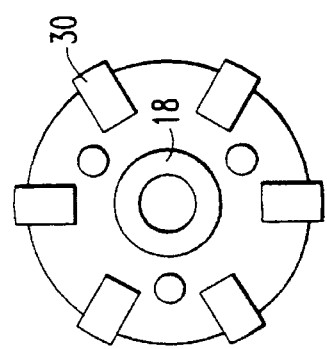
FIG. 2 is a cross sectional view of the device of FIG. 1 as seen from section A—A.

Pipe clamp 10 is secured within the pipe by two clamping mechanisms 28, one such mechanism being positioned within each pipe section. The clamping mechanism 28 may be any type of force bearing member which is adapted to affix the frame 18 within the pipe. FIG. 1 illustrates one such clamping mechanism design having a number of radially arrayed clamping wedges 30, as illustrated in FIGS. 1 and 2. The inclined portion of each wedge 30 bears on a conical cylinder (not shown) situated axially with respect to the pipe. A pneumatic cylinder 32 pulls the conical cylinder into the conical space formed by the inner faces of the clamping wedges 30, thereby forcing the clamping wedges 30 to move radially outward to mechanically wedge the clamp 10 to the inside of the pipe 12,14. A reaction plate 34 bears against the end of the clamping wedges to prevent the wedges 30 from moving axially. Each clamping device 28 may be operated independently using compressed gas controlled by solenoid valves 35, which may also be mounted on the pipe clamp frame 18. The clamping mechanisms 28 may also be provided with a means for movement (not shown) along the axis of the pipe in order to provide for precise positioning of the frame in relation to the pipe ends.

Gas purge dams 36 may be mounted on both ends of the pipe clamp 10. Such dams 36 make contact with the walls of the pipe sections 12,14, thereby forming a central chamber region 38 which includes the weld area and which may be filled with an inert gas during the welding process. The dams 36 may be formed by a ring of fiber brushes, or they may be pneumatically expanded elastomers or other such devices known in the art. The gas purge dams 36 may be separate structures, or they may be formed as an integral part of the clamping mechanisms 28. The gas supply utilized for the pneumatic cylinder 32 may also provide the purge gas, although such a design would typically include a valving device to reduce the pressure for the purge application.

An inspection device is located within the central chamber 38. The inspection device may be a nondestructive testing device, such as the miniature video camera 40 illustrated in FIG. 1. Such a camera 40 may include remotely adjustable lights 42. The inspection device may be mounted on a disk 44 which is rotatably attached to the frame 18. A motor (not shown) rotates the disk 44 in relation to the frame 18 and pipe axis, thereby causing the inspection device to scan the entire inner surface of the weld root pass. Other types of inspection devices may include, for example, other nondestructive testers such as an ultrasonic transducer, an eddy current probe, or a remotely operable dye penetrant system.

The pipe clamp 10 is operated by inserting it into one of two pipe sections 12,14 which are to be welded together. The pipe sections 12,14 may be placed into rough position prior to insertion of the pipe clamp 10, which is then rolled into a position which spans the weld joint location. The inspection device 40 may be used to verify proper positioning of the weld clamp 10 within the pipe sections, then one of the two clamping mechanisms 28 may be activated to lock the clamp 10 to one of the two pipe sections. After the second pipe section is moved to its final location in accordance with the desired pipe weld geometry, the second of the clamping mechanisms 28 is activated to secure the two pipe sections relative to each other. The interior gas purge chamber 38 may then be filed with a purge gas, and the two pipe sections are then joined by applying the root pass of the weld. Welding is normally done from the outside of the pipe, however, the pipe clamp 10 may also be fitted with a welding device for I.D. welding of the joint. The inspection device 40 may be used to monitor the welding process in real time, or it may be activated during or after completion of the root pass. In either case, the weld operator is provided with rapid feedback regarding the quality of the root pass weld. If a defect is detected, it can immediately be removed and replaced with new root pass weld metal, without the need to remove the pipe clamp 10 or to break the purge gas seal. By providing such immediate feedback regarding weld quality, any weld process variable which is creating defects may be promptly identified and corrected, thereby eliminating further problems before they occur.

Figure 3:
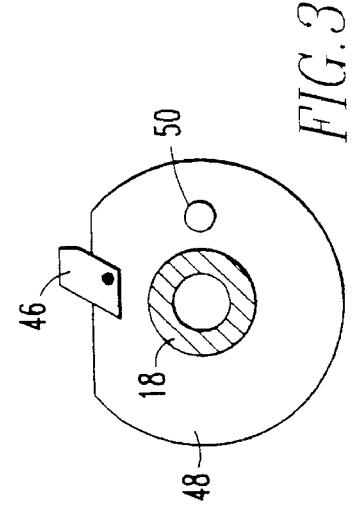
FIG. 3 is a cross sectional view of a pipe clamp having a dressing tool.

It is often desirable to perform a minor amount of grinding, buffing, machining, heating or touch-up welding to the inside diameter of a pipe weld. This process, often called dressing the weld, may be desirable in order to improve the smoothness of the I.D. surface finish, thereby improving the inspectability and the fatigue resistance of the weld metal. It may also be desirable to dress the I.D. of the weld to obtain a specific minimum diameter to assure the passage of an inspection pig after the pipeline is in service. In such cases, the pipe clamp 10 may be fitted with a dressing tool 46, as illustrated in FIG. 3. FIG. 3 is an end view of a section of a pipe clamp built in accordance with this invention as viewed from a location next to a dressing tool 46. The dressing tool 46 may be rotatably mounted to the frame 18 on a disk 48 in a manner similar to the inspection device 40 of FIG. 1. The dressing tool 46 may contain a brush, grinding wheel, cutting tool, torch, electrode or other such end effectors. A vaccum line connection 50 may be provided in order to remove any metal shavings or other debris created during operation of the dressing tool 46.

This disclosure reveals the preferred embodiment of the invention. However, variations in the form, construction and arrangement of components and the modified application of the invention are possible without departing from the scope of the invention as claimed.

We claim:

1. A pipe clamp for use in securing a first pipe having a first pipe end in relation to a second pipe having a second pipe end to secure a gap of predetermined dimensions between said first and said second pipe ends comprising:

a frame adapted for insertion into said first and said second pipes;

a first plurality of radially arranged clamping wedges attached to said frame, said first plurality of radially arranged clamping wedges adapted to lock said frame in relation to said first pipe end, thereby preventing relative movement between said frame and said first pipe;

a second plurality of radially arranged clamping wedges attached to said frame, said second plurality of radially arranged clamping wedges adapted to lock said frame in relation to said second pipe end, thereby preventing relative movement between said first pipe and said second pipe; and means for inspecting supported on said frame, said means for inspecting being operable to inspect the region of said gap while said first and said second plurality of radially arranged clamping wedges are locked to said first and said second pipe ends respectively.

2. The pipe clamp of claim 1, further comprising a means for purging said frame and operable to provide a purge gas to the region of said gap.

3. The pipe clamp of claim 2, wherein said means for purging comprises a first purge dam proximate said first means for clamping, a second purge dam proximate said second means for clamping, and a means for supplying a purge gas to the chamber between said first and said second purge dams.

4. The pipe clamp of claim 1, wherein said means for inspecting comprises a nondestructive tester.

5. The pipe clamp of claim 1, wherein said means for inspecting further comprises a disk rotatably attached to said frame between said first and said second plurality of radially arranged clamping wedges.

6. The pipe clamp of claim 5, further comprising a video camera attached to said disk.

7. The pipe clamp of claim 2, wherein said means for inspecting is operable to inspect the region of such gap while said means for purging is operating.

8. The pipe clamp of claim 1, further comprising means for dressing attached to said frame.

9. The pipe clamp of claim 8, wherein said means for dressing comprises a machining tool.

10. The pipe clamp of claim 8, wherein said means for dressing comprises a grinding wheel.

11. The pipe clamp of claim 8, wherein said means for dressing comprises a brush.

12. The pipe clamp of claim 8, further comprising a vacuum line connection for removing debris created during operation of said means for dressing.

13. A method of joining a first pipe end to a second pipe end comprising the steps of:

inserting within said pipe ends a pipe clamp having a frame, a first plurality of radially arranged clamping wedges attached to said frame, a second plurality of radially arranged clamping wedges attached to said frame, and means for inspecting supported on said frame;

activating said first and said second plurality of radially arranged clamping wedges to lock said pipe clamp to said first and said second pipes respectively, thereby preventing relative motion between said first pipe end and said second pipe end;

joining said pipe ends together by forming a weld therebetween;

operating said means for inspecting to perform an inspection of said weld prior to deactivating said first and said second plurality of radially arranged clamping wedges;

deactivating said first and said second plurality of radially arranged clamping wedges.

14. The method of claim 13 wherein said pipe clamp further comprises a means for purging, and further comprising the step of establishing a gas purge in the region of said gap prior to the step of joining said pipe ends.

15. The method of claim 14 wherein said gas purge is maintained during the step of operating said means for inspecting.

16. The method of claim 13 wherein said pipe clamp further comprises a means for dressing attached to said frame, further comprising the step of dressing said weld prior to the step of operating said means for inspecting.

17. The method of claim 16 wherein said pipe clamp further comprises a means for purging, further comprising the steps of:

establishing a gas purge in the region of said gap prior to the step of joining said pipe ends; and maintaining said gas purge during the step of dressing said weld.

18. The pipe clamp of claim 1, further comprising a first and a second ring of fiber brushes attached to said frame and positioned to define a gas purge chamber in said region of said gap.

* * * * *